Oct. 5, 1965  I. S. SPULGIS ETAL  3,209,518
DEVICE AND METHOD FOR SEPARATING A LIQUID FROM A GAS
Filed April 19, 1961  2 Sheets-Sheet 1

INVENTORS.
IVARS S. SPULGIS
MAURICE S. DECKER
LUDWIG A. MAJNERI
BY Alfred L. Patmore, Jr.
ATTORNEY

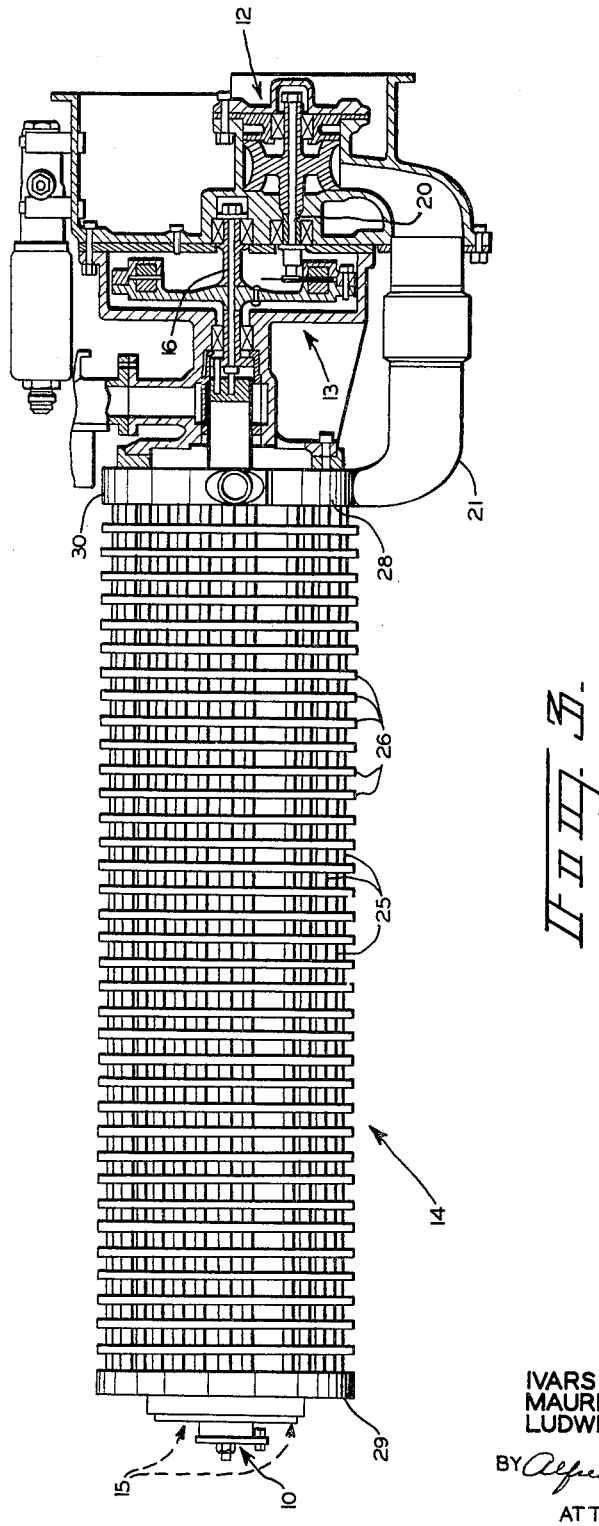

United States Patent Office 3,209,518
Patented Oct. 5, 1965

3,209,518
DEVICE AND METHOD FOR SEPARATING A
LIQUID FROM A GAS
Ivars S. Spulgis, Maurice S. Decker, and Ludwig A. Majneri, Columbus, Ohio, assignors to Midland-Ross Corporation, Toledo, Ohio, a corporation of Ohio
Filed Apr. 19, 1961, Ser. No. 104,047
7 Claims. (Cl. 55—25)

The invention described herein was made in the performance of work under a NASA contract and is subject to the provisions of the National Aeronautics and Space Act of 1958, Public Law 85–568 (72 Stat. 426; 42 U.S.C. 2451), as amended.

The present invention is concerned with devices for separating gases from liquids and for venting the gases so separated, and more particularly with an improved apparatus for separating the vaporous phase of a material from a mixture of its vaporous phase and its liquid phase in an enclosed container or storage vessel and for venting the separated vapor. The apparatus of the present invention is especially useful in space vehicles for conserving fuel such as hydrogen, as well as other liquids, under zero gravity conditions.

The invention will now be explained by specific reference to the conservation of liquid hydrogen fuel, but this reference is solely for purposes of illustration, as subsequently will be discussed in more detail.

Space vehicles must have restarting capabilities if they are to accomplish a prolonged mission in space involving interplanetary distances. Therefore, such a vehicle must conserve its fuel or propellant for an extended period of time, and the conservation of a maximum amount of fuel presents problems which are of particular importance in the case of cryogenic propellants, such as liquid hydrogen and oxygen combinations. Hydrogen is used for fuel in space vehicles because of the high specific impulse obtained from this material which far exceeds the specific impulses obtainable from other fuels and oxidizer combinations.

However, liquid hydrogen boils at about −422° F. and requires only 190 B.t.u.'s to vaporize one pound of this fuel. While there is no problem of heat transfer into the liquid hydrogen by conduction or convection as the vehicle travels through outer space, there is considerable heat input from solar radiation. This heat from the sun raises the temperature of the liquid hydrogen, vaporizes some of the liquid, and consequently the pressure inside the tank begins to increase.

The pressure within the fuel tank must be kept to a safe limit to prevent explosion. If the temperature of the liquid hydrogen could be reduced, the vapor pressure of the hydrogen would be lowered, and the result would be achieved. However, inasmuch as there is no refrigerator available which will work efficiently in the temperature region of −422° F., and particularly under high vacuum, this method of relieving the pressure is not practical. A second method is to let some of the vapor escape from the tank thereby reducing the pressure within the tank. However, this means losing some of the hydrogen that is to be conserved.

Venting a container in outer space involves a serious problem because it is difficult to ascertain the location of vapor under a zero gravity environment. The apparatus used to vent the container must be capable of releasing the hydrogen vapor whether it is formed in localized pockets or is dispersed evenly throughout the liquid. If the pressure is relieved by dumping liquid hydrogen, the fuel may be dissipated before the pressure is decreased to a reasonable degree. Therefore, the vapor must be separated from the liquid and the separated vapor vented.

It is, therefore, an object of the present invention to provide a method and apparatus for separating the vaporous phase of a material from a mixture of saturated liquid and vapor and for venting the separated vapor, which apparatus is operable to separate and vent vapor from the mixture under conditions of zero gravity and low temperature.

Another object of the invention is to provide a device for separating the vaporous phase of a material from a mixture of its vapor and liquid in a container and for venting the separated vapor, which apparatus discharges the vapor at a higher temperature than the bulk temperature of the liquid in the container.

A further object of the invention is to provide apparatus for separating and venting vapor as aforesaid, which apparatus transfers heat from the liquid in the container to the vapor.

A still further object of the invention is to provide apparatus for venting a vapor from an enclosed container, which apparatus has a minimum of weight and operates with an optimum of efficiency.

Still another object of the invention is to provide apparatus for separating vapor from liquid in an enclosed container and for venting the separated vapor, which apparatus is economical to manufacture and has high reliability because it contains relatively few moving parts.

A still further object of the invention is to provide a device for separating vapor from liquid and venting the vapor, which apparatus utilizes the cooling effect of the expanded vapor to cool the remaining liquid.

Also an object of the invention is to provide apparatus for separating gases from liquids and venting the separated gases, which apparatus includes a centrifugal separator and eliminates the need for external power to drive the same.

Other objects and advantages of the invention will be apparent from the specification which follows and from the drawings in which like numbers are used throughout to identify like parts.

FIG. 3 is an assembly view in elevation, with parts broken away to show details of construction of the apparatus shown schematically in FIG. 1.

Figure 1:
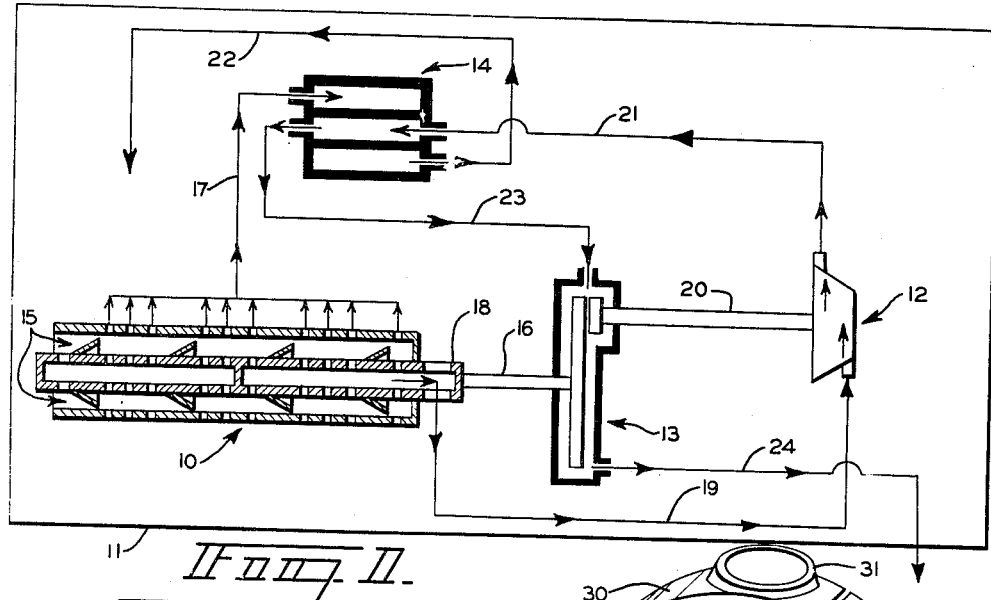
FIG. 1 is a schematic diagram of the apparatus of the invention.

In order to achieve the aforementioned objects there is provided apparatus for separating vapor from saturated liquid within a container, and for venting the separated vapor. The specific apparatus shown in the drawings comprises a centrifugal separator that is driven by an expander turbine through an eddy current device. After the vapor has been separated from the liquid in the centrifugal separator, it is expanded in the expander turbine while the liquid from the separator is transferred to a heat exchanger. After the vapor has been expanded in the turbine, it is likewise conducted to the heat exchanger where it further cools the liquid that is supplied by the separator. The eddy current device, besides transferring driving torque to the separator, dissipates excess power from the turbine into heat, and this device is cooled by the vapor that is discharged from the heat exchanger.

Referring now to the drawings, the apparatus of the present invention is shown schematically in FIG. 1, and this device includes a centrifugal separator 10 that is suspended in a vessel 11 containing a mixture of liquid and gaseous hydrogen. The apparatus further includes an expander turbine 12 that is used to drive the separator 10 through a magnetic coupling 13 or eddy current device while a heat exchanger 14 is utilized in a manner that will be described later in detail.

In operation, liquid hydrogen containing hydrogen vapor enters an inlet end 15 of the separator 10 at a temperature of 39.1° R. and a pressure of 22 p.s.i.a. The separator 10 is driven by a shaft 16 coupled to the magnetic coupling 13, and the liquid hydrogen is moved to the outer surface of the separator 10 by centrifugal force. The separator 10 imparts a tangential velocity component to the fluid particles without causing excessive losses due to fluid friction. The hydrogen vapor is extracted from the center of the separator 10 while the liquid hydrogen is expelled through a plurality of circumferential openings and moves to the heat exchanger 14 along a path indicated by a line 17, where it is directed across the heat exchanger surfaces to be cooled by the hydrogen vapor in a manner which will be described later. Hydrogen vapor leaves a discharge end 18 of the separator 10 and moves through a suitable conduit 19 to the inlet side of the turbine expander 12. At this point the hydrogen vapor has a temperature of 38.3° R. and a minimum pressure of 18 p.s.i.a.

The turbine 12 operates with optimum efficiency at low flow rates and with moderately high rotational speeds. More particularly the turbine 12 is of the impulse type which is less sensitive to the effects of thermal contraction and expansion than other types because of the lack of close blade tolerances and which can accommodate the formation of liquid during the expansion process. More nearly isentropic expansion can also be achieved with an impulse type turbine.

As the vapor moves through the expander turbine 12 it is expanded from the pressure of 18 p.s.i.a. on the inlet side to a pressure of approximately 3 p.s.i.a. on the discharge side with the corresponding decrease in temperature to 30.8° R. The expansion of the hydrogen vapor from 22 p.s.i.a. at the inlet end 15 of the separator 10 to approximately 3 p.s.i.a. at the discharge side of the expander turbine 12 preferably follows as closely as possible a theoretical isentropic or reversible adiabatic process wherein the entropy of the hydrogen vapor does not change. At this stage the gaseous hydrogen is approximately 94% vapor and 6% liquid. As the gaseous hydrogen passes through the turbine 12 it rotates a shaft 20 that is coupled to the magnetic coupling 13 which drives the shaft 16.

The expanded hydrogen vapor is conveyed through a line 21 to the heat exchanger where it removes the maximum possible amount of heat from the liquid hydrogen that is supplied to the heat exchanger 14 through the line 17. The heat exchanger 14 is designed to cause the lowest possible pressure drop in the liquid hydrogen, yet it produces sufficient turbulence to ensure an efficient heat transfer. By locating the heat exchanger 14 circumferentially around the centrifugal separator 10, necessary flow of the liquid hydrogen across the heat exchanger elements is provided and if any hydrogen vapor should be expelled with the liquid it will be partially condensed. The hydrogen vapor leaves the heat exchanger 14 at a temperature of 37.8° R. and is expanded to a pressure of 2 p.s.i.a. Heat is removed from the saturated liquid hydrogen, which is cooled to a temperature of 38.74° R. and the pressure is lowered somewhat to 21.5 p.s.i.a. This cooled liquid moves along a line 22 back to the hydrogen vessel.

The magnetic coupling 13 is cooled by hydrogen vapor that is supplied from the heat exchanger 14 through a line 23. During this cooling the vapor is heated to 44.2° R. and is expanded to 1 p.s.i.a. The vapor is then discharged to space through a line 24.

Figure 2:
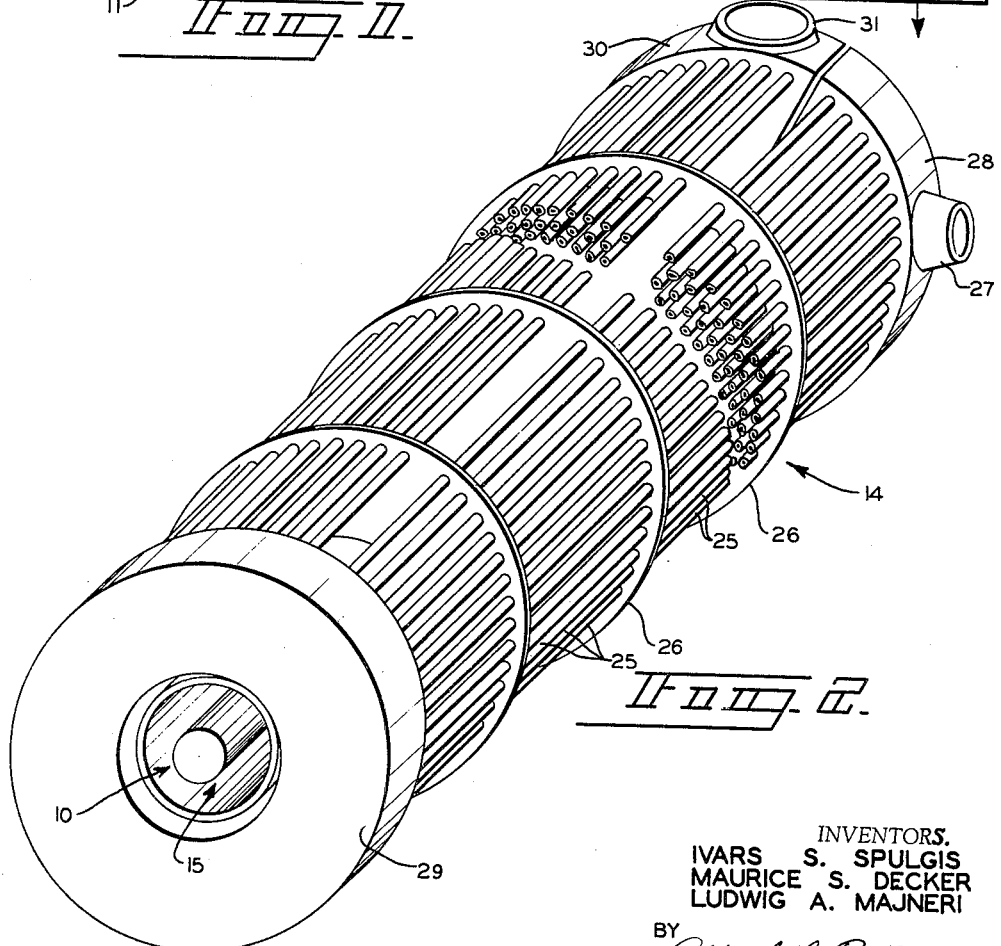
FIG. 2 is a perspective view of a centrifugal separator and an associated heat exchanger which are parts of the apparatus of FIG. 1.

Referring now to FIG. 2, the heat exchanger 14 and the centrifugal separator 10 are shown in assembled relationship. The heat exchanger 14 comprises a plurality of tubes 25 which are mounted in annular plates 26. The centrifugal separator 10 is disposed wholly within the heat exchanger 14, only an end of the rotor thereof which is adjacent the inlet 15 being shown in FIG. 2. It will be appreciated that liquid hydrogen thrown out centrifugally by the separator 10 comes into contact with the exterior surfaces of the tubes 25 for heat exchange therewith. Vapor flowing in the line 21 (FIG. 1) from the expander turbine 12 is delivered through an inlet 27 (FIG. 2) and a header 28 to a first bank of the tubes 25. Vapor from the first bank of tubes 25 is delivered to a return header 29 and flows from thence through a second bank of the tubes 25 to an outlet header 30, an outlet 31, and finally through the line 23 (FIG. 1) to the eddy current device 13. The heat exchanger 14 is acutally about 6 inches in diameter and 21 inches in overall length. Each of the tubes 25 is a little less than one-half inch long. FIG. 2 is somewhat distorted for purposes of illustration.

The assembled relationships among the several components of the apparatus shown schematically in FIG. 1 will be apparent from FIG. 3. As assembled, the centrifugal separator 10 and the heat exchanger 14 have substantially the same relationships as those shown in FIG. 2, while the expander turbine 12 and the eddy current device 13 are generally adjacent the discharge end 18 of the separator 10. It will be appreciated that the line 24 (which does not show in FIG. 3, but which will be found in the schematic view of FIG. 1) is open to external conditions, whatever they may be, so that there is a driving force tending to cause a flow through the inlet 15 and the rest of the device, as previously described, whenever the pressure at the inlet 15 exceeds the exterior pressure. Since this condition prevails in all known circumstances when the heat exchanger 14 and the centrifugal separator 10 are within a storage tank containing liquid hydrogen to which heat is being added, unless the liquid hydrogen is cooled excessively, the device is one which, once started by a pressure differential as indicated, will tend to operate without attention so long as there remains a supply of liquid hydrogen to be protected. For example, a tank of liquid hydrogen in surroundings of ordinary ambient conditions and at a temperature of 39.1° Rankine and a pressure of 22 p.s.i.a. would tend to cause the device of the instant invention to operate and to compensate for heat gains to the liquid hydrogen. This is true whether or not the hydrogen within the tank was being cooled by other means.

It will be apparent from FIG. 3 that the apparatus of the instant invention, when appropriately positioned in a tank or other vessel containing liquid hydrogen and hydrogen vapor under most conditions, will tend to draw through the inlet 15 and into the separator 10 the contents of the vessel which are adjacent the inlet. When liquid hydrogen is drawn therethrough, and the separator 10 is operating, as described, this liquid hydrogen is thrown radially outwardly and forced into contact with the tubes 25 of the heat exchanger 14. There is, however, nothing to prevent liquid or vaporous hydrogen which has not been drawn through the inlet 15 from coming into contact with the tubes 25, and from giving up heat thereto as described above. When the liquid hydrogen is discharged radially by the separator 10 such hydrogen is forced to mingle with other liquid hydrogen, hydrogen vapor or both already occupying the space exterior of the separator 10, but within the heat exchanger 14.

The best presently known mode of the instant invention has been described above. It will be apparent, however, to one skilled in the art that various changes and modifications can be made from the specific details set forth without departing from the spirit and scope of the appended claims. For example, as has been indicated, while the invention has been described particularly in connection with the separation of a liquid-vapor mixture of hydrogen, the apparatus is equally operable for accomplishing such separation relative to any liquid-vapor composition, and for venting separated vapor. It will be appreciated that, in the case of a space vehicle using hydrogen as a cryogenic propellant, a liquid oxygen supply is also required. The liquid oxygen must also be protected against overheating, and the apparatus described above in connection with hydrogen can equally well be used to protect liquid oxygen. Even drinking water must be confined under zero gravity conditions, and would tend, in the absence of suitable cooling means, to absorb heat until it exerted a pressure too great for any suitable lightweight receptacle. It will be apparent, therefore, that some means for protecting drinking water is required, and that the apparatus according to the invention is suitable for such use. While the problem is peculiarly acute with extremely low boiling materials such as hydrogen, apparatus according to the invention can be used to protect substantially any liquid that it may be desired to carry aboard a space vehicle.

One skilled in the art will appreciate that the purpose of the magnetic coupling or eddy current device 13 in the apparatus specifically discussed is principally to transmit power from the expansion turbine 12 to the separator 10, and suitably to reduce the speed. The eddy current device, however, is particularly suitable because it is capable of converting to heat some of the energy which is transmitted to it from the turbine 12, and because this enables an increase in the amount of energy that can be dissipated with the apparatus per unit quantity of hydrogen or the like vented. However, other power transmitting and speed-reducing devices can be used, even without the heat generation feature, and devices other than the eddy current device which are capable of converting a part of the energy to heat can also be employed. For example, a mechanical type of speed reducer could be provided in the transmission chain between the turbine and the separator, and a small electric generator driven in a suitable manner by the transmission means can be provided with a secondary circuit closed through a resistance element, so that energy consumed by the generator is converted to electricity which, in turn, is converted to heat in the resistance element. By heat transfer between the resistance element and the spent hydrogen or other vapor, substantially the same results as those previously described can be achieved. Numerous other changes and modifications will be apparent to one skilled in the art.

We claim:

1. Apparatus for separating vapor from a mixture of liquid and vapor and for venting the separated vapor, said apparatus comprising a separator for removing vapor from the mixture, a turbine driven by said vapor, an eddy current device effective to couple said separator in driven relationship relative to said turbine, said eddy current device also being effective as a speed reducer, and being effective to convert to heat part of the energy transmitted to it, an indirect heat exchanger adjacent said separator for receiving liquid therefrom, means for supplying vapor from said turbine to said heat exchanger for indirect heat exchange with the liquid therein, and means for conducting vapor from said heat exchanger to said eddy current device for cooling the same.

2. Apparatus for removing from a storage vessel a mixture of liquid and vapor, for separting and venting vapor from the mixture and for returning liquid to the vessel, said apparatus comprising an indirect heat exchanger, an expansion turbine, a centrifugal separator having a rotor and a stator and effective to receive the liquid-vapor mixture from the vessel, to separate liquid from the mixture and to deliver the separated liquid to said heat exchanger, means for receiving separated vapor from said separator and for delivering such separated vapor as a power fluid to said turbine, transmission means including an eddy current device effective to transmit power from said turbine to drive the rotor of said separator, means for delivering spent vapor from said turbine to said heat exchanger for indirect heat exchange with the liquid therein, means for delivering vapor from said heat exchanger into heat exchange relationship with the eddy current device of said power transmitting means, and means for venting from the apparatus vapor which has undergone heat exchange with the eddy current device.

3. Apparatus for removing from a storage vessel a mixture of liquid and vapor, for separating and venting vapor from the mixture and for returning liquid to the vessel, said apparatus comprising an indirect heat exchanger, an expansion turbine, a centrifugal separator having a rotor and a stator and effective to receive the liquid-vapor mixture from the vessel, to separate liquid from the mixture and to deliver the separated liquid to said heat exchanger, means for receiving separated vapor from said separator and for delivering such separated vapor as a power fluid to said turbine, transmission means effective to connect said turbine in driving relation to said separator, effective to reduce speed, and effective to convert some energy to heat, means for delivering spent vapor from said turbine to said heat exchanger for indirect heat exchange with the liquid therein, means for delivering vapor from said heat exchanger into heat absorbing relationship with the energy converting portion of said transmission means, and means for venting from the apparatus vapor which has been delivered in heat absorbing relationship with the energy converting portion.

4. The method of separating vapor from a mixture of liquid and vapor at a relatively high pressure and for venting the separated vapor to a relatively low pressure space comprising passing a stream of the mixture through a turbine driven centrifugal separator, passing the separated vapor through the driving turbine, expanding the separated vapor in the driving turbine sufficient to provide enerby in excess of that energy required to drive the centrifugal separator, converting the excess energy to heat, transferring the heat to the separated vapor prior to venting the separated vapor, and venting the separated vapor to the relatively low pressure space.

5. The method according to claim 4 wherein the heat is transferred to separated vapor subsequent to the expansion of the separated vapor in the driving turbine.

6. In apparatus for separating vapor from a mixture of liquid and vapor, the improvement comprising, in combination, a centrifugal separator for removing vapor from the mixture, an expander turbine, means to deliver separated vapor from the separator to the expander turbine for expansion therein to convert energy in the separated vapor to kinetic energy, coupling means adapted to convert to heat a portion of kinetic energy from the turbine and to transmit a portion of the kinetic energy to the separator to drive the separator, and cooling means for absorbing the heat into which the portion of the kinetic energy from the turbine is converted by the coupling comprising means for flowing a stream of separated vapor in heat exchange relationship with the coupling.

7. Apparatus according to claim 6 wherein said coupling comprises a speed reducing eddy current device.

References Cited by the Examiner

UNITED STATES PATENTS

| | | | |
|---|---|---|---|
| 2,441,631 | 5/48 | Hills | 55—404 X |
| 2,728,406 | 12/55 | Maher | 55—174 X |
| 3,107,988 | 10/63 | Taylor et al. | 55—404 X |

OTHER REFERENCES

"Eddy-Current Couplings Adjust Oswego Combustion," by Harry A. Piasecki, Electrical World, June 13, 1942.

REUBEN FRIEDMAN, *Primary Examiner.*

HERBERT L. MARTIN, *Examiner.*